Dec. 14, 1948.  B. T. MAXWELL  2,456,521
PRISM SYSTEM AND PRISM SYSTEM MOUNT
FOR OPTICAL VIEWING INSTRUMENTS
Filed Sept. 8, 1945  5 Sheets-Sheet 1
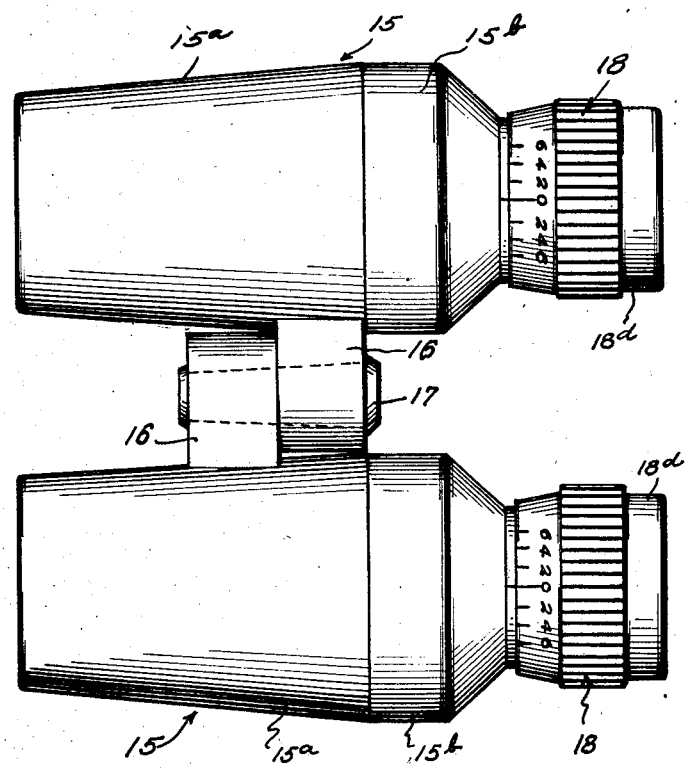
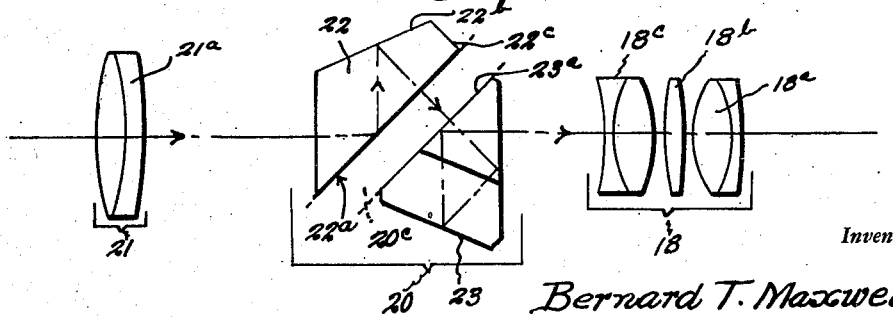
Inventor
Bernard T. Maxwell
By Clarence A. O'Brien
and Harvey B. Jacobson
Attorneys Dec. 14, 1948.                B. T. MAXWELL                2,456,521
                  PRISM SYSTEM AND PRISM SYSTEM MOUNT
                      FOR OPTICAL VIEWING INSTRUMENTS
Filed Sept. 8, 1945                              5 Sheets-Sheet 2
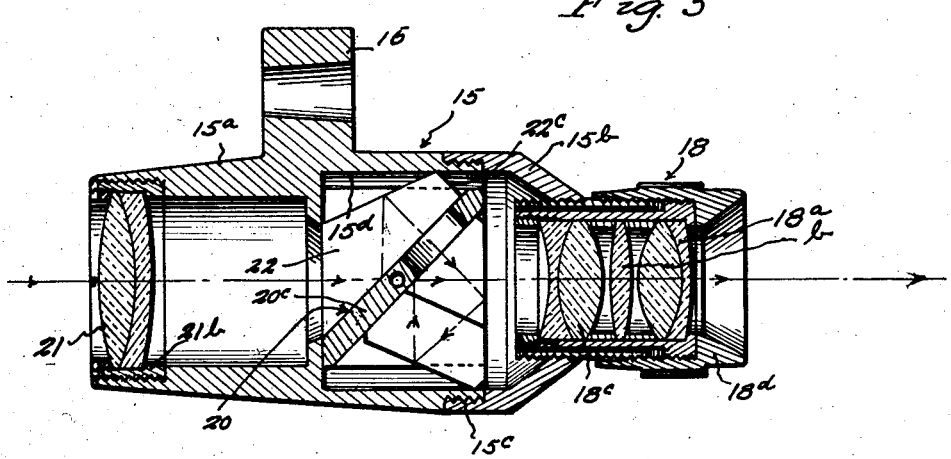
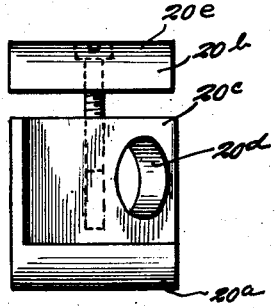
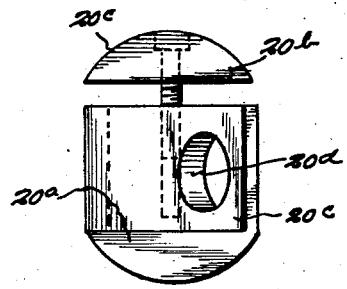
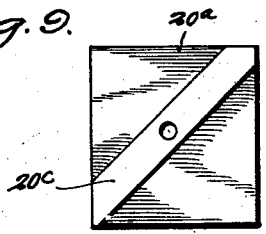
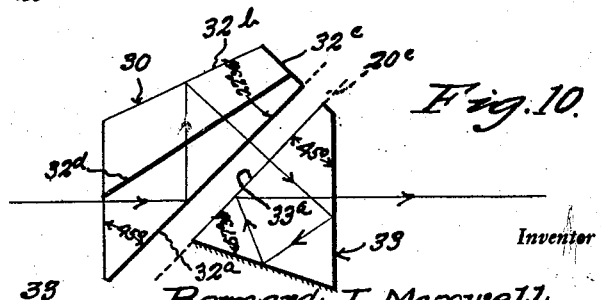
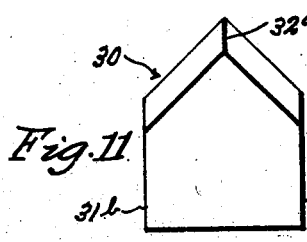
Inventor
Bernard T. Maxwell
By Clarence A. O'Brien
and Harvey B. Jacobson
Attorneys Dec. 14, 1948.   B. T. MAXWELL   2,456,521
PRISM SYSTEM AND PRISM SYSTEM MOUNT
FOR OPTICAL VIEWING INSTRUMENTS
Filed Sept. 8, 1945   5 Sheets-Sheet 3
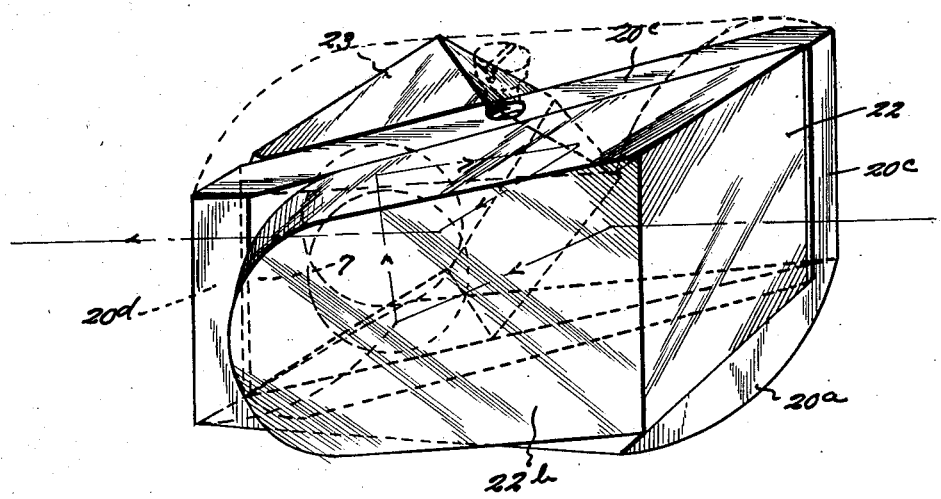
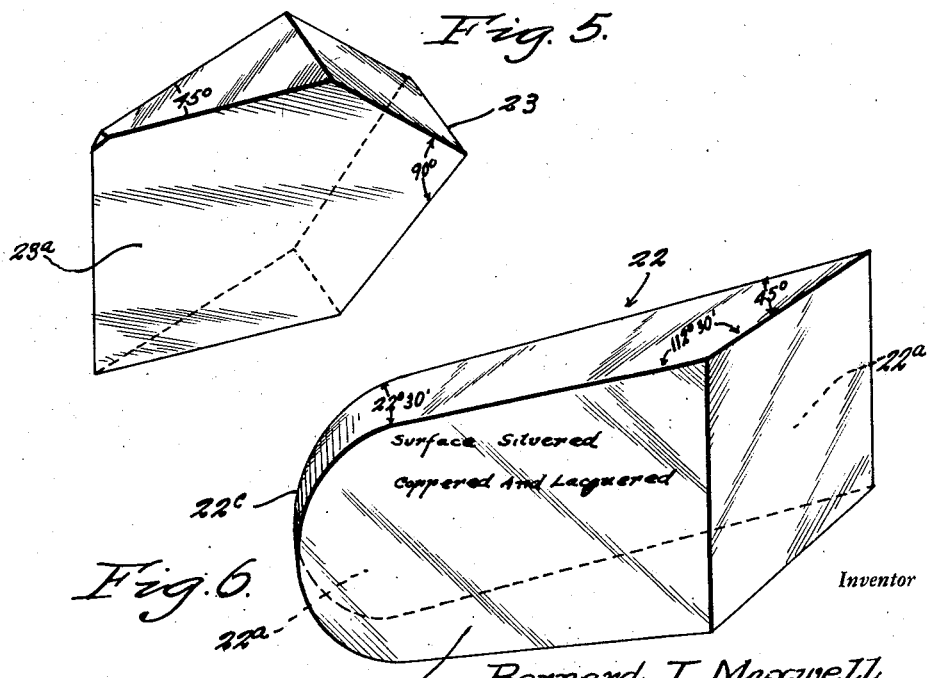
Inventor
Bernard T. Maxwell
By Clarence A. O'Brien
and Harvey B. Jacobson
Attorneys Dec. 14, 1948.  B. T. MAXWELL  2,456,521
PRISM SYSTEM AND PRISM SYSTEM MOUNT
FOR OPTICAL VIEWING INSTRUMENTS
Filed Sept. 8, 1945  5 Sheets-Sheet 4

Inventor
Bernard T. Maxwell

By Clarence A. O'Brien
and Harvey B. Jacobson
Attorneys

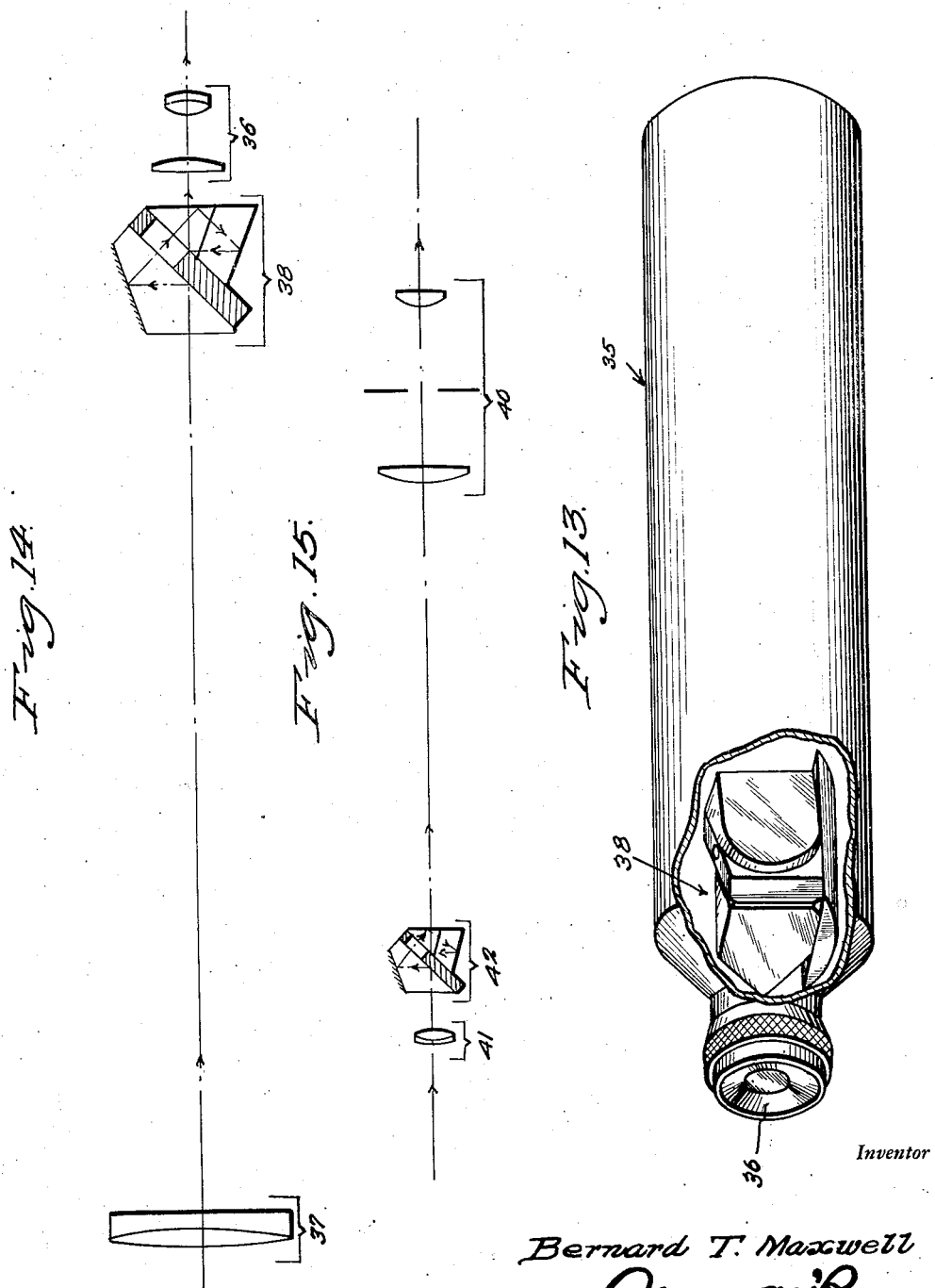

Patented Dec. 14, 1948

2,456,521

UNITED STATES PATENT OFFICE 2,456,521

PRISM SYSTEM AND PRISM SYSTEM MOUNT FOR OPTICAL VIEWING INSTRUMENTS

Bernard T. Maxwell, Fairport, N. Y.

Application September 8, 1945, Serial No. 615,113

10 Claims. (Cl. 88—33)

This invention relates to optical instruments as generally described in my co-pending application Serial No. 493,078, filed July 1, 1943, now abandoned, and of which this forms a continuation-in-part.

The present invention relates to optical instruments on a straight line optical axis where it is desired to obtain wide angle of view with high powers and magnifications in and through the medium of telescopes, field glasses, opera glasses, surveying instruments, prism binoculars and microscopes, whether monocular or binocular instruments, in which are combined systems of prisms and lenses, the lenses being separately and independently mounted and collimated in a straight bored, tapered or cylindrical tube, and wherein a separately and independently collimated prism system consisting of a separate, independent and unattached housing containing an apertured diaphragm stop between a constant deviation prism and an erecting roof prism, with no displacement of the prisms as regards the optical axis, is inserted as a separate unit or sub-assembly into the straight bored, tapered or cylindrical lens tube optical axis between the eye-piece and the objective, the outer arc of the said prism housing snugly fitting the inner bore of the tube so that such insertion of said prism system immediately completes final collimation of the entire instrument, regardless of the angle in the arc of the tube at which such prism system insertion is made or the angle rotatively or radially it may immediately or thereafter assume to any one or all of the optical elements of the instrument, the insertion effecting such immediate and complete collimation being made without the use of screws or equivalent mechanical affixing devices or requiring a pre-determined angular position in the arc of the tube to effect or to maintain such collimation and without requiring means for restraining further rotational movement of the prism system after such insertion. Thus, in instruments of this type, we succeed in effecting complete and final collimation by mere insertion of the prism system into the bore of the tube without referring to angular position therein.

Assembly and collimation of the lenses and prisms in a straight bored, tapered or cylindrical tube is separately and independently accomplished in the usual manner of an ordinary telescope, a properly centered objective lens in mount being threaded into the larger end of the tube and a properly centered eye lens in mount being threaded into the smaller end of the tube. In the binocular type body two such tubes are put together in the usual manner by a hinge arrangement to maintain parallelism for all interpupillary adjustments by having the optical axes on each side not only parallel to each other but also parallel to the mechanical axis of the hinge.

Assembly and collimation of the prism system is separately and independently accomplished by inserting a constant deviation prism into one side of the prism housing and affixing or tightening same therein with a screw through one wall of the housing, preferably a tubular or pipe type Allen set screw. Next the roof prism is inserted on the other side of the apertured diaphragm or stop of the prism housing and when collimation of the prism system has been effected through orientation of the roof prism the roof prism is likewise affixed in such position by a tubular or pipe type screw. Such assembly and collimation of the prism system is effected as a separate and independent subassembly job outside of and totally disconnected from the tubular or main instrument body.

In a binocular, collimation means the lining up of the optical axis of each side of the binocular with the axis of the hinge. This means that for all interocular adjustments of the binocular the optical axes of the two sides are parallel. An ordinary binocular is collimated in two ways: by the use of an eccentric ring on either the objective or eyepiece, and adjusting these to collimate the binocular or by means of screws or similar devices to change the positions of the prisms and to maintain them in such fixed position. In the great majority of cases, all work of collimation is performed inside the binocular and involves many intricate adjustments. No binocular heretofore made can have each and every part replaced without the entire system having to be recollimated. In this new method of mounting, because the prism mount accurately fits into the body bore without requiring screws and similar rigid fixing devices and further because the prism mounts and lens mounts are collimated independently of one another, and collimation is instantaneous upon insertion of the prism mount and lens mounts in the tube, either lenses or prism system can be interchanged or replaced partly or completely without the binocular having to be recollimated. Thus, we have interchangeable parts in a binocular as to each and every subassembly thereof without recollimation of the instrument.

The prism housing in which the prisms are collimated and affixed as above set forth is constructed of one or two pieces, preferably one piece, of metal or other suitable material as illustrated in the drawings, the outer cylindrical or tapered surface being constructed to fit snugly into the corresponding cylindrical or tapered bored tubes. The diaphragm section of the prism housing diagonally bisects the said housing and in such diaphragm there is an aperture placed vertically in the center thereof and longituidnally placed accordingly to the size and angular shape of the prisms being used. Thus the diaphragm serves both to separate the prisms and to provide the aperture required. With the prisms collimated and affixed in such prism housing nothing remains but to place said housing in the tube to effect instantaneous collimation of the entire instrument.

In the cylindrical, elliptical, rectangular or square form of tube and outer prism housing or mount instant collimation takes effect regardless of whether the deviation prism end or the roof end of the prism housing is first inserted in the tube. Thus, in an instrument of this type, we have a separate independently collimated and unattached prism sub-assembly system not requiring affixing of screws, springs, clips and similar mechanical devices for assuring rigidity and not requiring manipulating devices for recollimation after insertion in the binocular.

In this case the aperture diaphragm achieves an unusual result. Ordinarily, diaphragm stops are used to control the amount of light passing through a system, locate position of the exit pupil, get rid of troublesome reflections and "ghosts," or reduce aberrations. In this instance, the apertured diaphragm is used to rule out extra exit pupils. The diaphragm with aperture in this instance acts similar to the baffle plate in a mechanical device, it baffles the light by allowing passage of reflected light and barring passage of refracted light. In no other straight line axis binocular do we find a diaphragm with aperture. The diaphragm rules out refracted light and the aperture in the diaphragm is to permit the passage of reflected light from one prism to the other. Absence of the diaphragm and therefore the aperture therein would limit the system to small views of low power and magnification. A straight line axis optical system will work without a diaphragm stop but without an apertured diaphragm the straight line optical system cannot cover a wide field or be used for high powers. As some of the light is not reflected in the system as it should be but is refracted and passes through the reflecting surfaces forming a secondary highly chromatic exit pupil which is displaced from the main or usable exit pupil thus producing more than just one exit pupil on each side of the binocular. Putting in the apertured diaphragm gets rid of these exit pupils and makes it possible to use the system for wide fields and high powers.

The position of the diaphragm aperture is very important. The working apertures of the prisms must be concentric therewith. The diaphragm aperture must be placed between the prisms and nowhere else in order to get rid of the extra exit pupils and also to keep down the size of the prisms. And it must be placed in the centre of the vertical of the prism housing to get rid of refracted light which causes extra exit pupils. The placement of the aperture in the longitudinal direction of the prism mount diaphragm will vary according to the size of the prisms used as it is related to the increased angle of the deviation prism as above referred to and that angle varies according to the type of glass used in the erecting system and the objective aperture and magnification of instrument desired.

To assist further in utilizing smaller prisms while obtaining still wider angles of view, the constant deviation prism we utilize do not follow conventional angles. The conventional is generally considered to be 45° and the change made is through increase of that angle if the system is to use small prisms to produce an extra wide field in combination with the apertured diaphragm.

The prisms in the prism system may be constructed in different forms and may be of higher or lower index of refraction as the results sought may differ for binoculars required to perform in specific instances, but for the generally desired combination of wide field and high power it is believed that the apertured diaphragmed roof and constant deviation prism combination presents the closest to the ideal not only for the wide field with high power and magnification but also to achieve a small, compact instrument.

It matters not whether the outer surface of the housing part of the prism system be cylindrical, tapered, elliptical, rectangular, truncated, pyramidal or square, just so the main tubular housing bore is formed to accommodate it in a close fit in a position maintaining the two housings parallel one within the other and concentric with one another. Nor does it matter if it be considered desirable to make the insertion of the one in the other by means of reciprocal shelves, guide rails and slots or by threading, if by such means a close fitting parallel position is maintained. We generally describe the tube bore and prism system outer housing as cylindrical and prefer that shape as it permits the most simplified construction, ease in assembly, insertion of the prism system at any angle in the circular arc of 360 degrees without a fixed or predetermined position. In most of the type forms described the prism system is reversible on the geometric axis without disturbing collimation or results. In the cylindrical form the prism system will revolve with complete circular motion without affecting collimation of the instrument. If it is conceivable that continuous revolving of the prism system might be desired for any purpose while the instrument is in use, as for instance in some possible experiment involving polarization of light, the instrument will remain in collimation while the prism system is being continuously revolved through some added medium of actuation not claimed herein.

The foregoing illustrates clearly the function of the tubular bore as it is the combination of the tubular bore and the outer prism housing concentric therewith and snugly fitting parallel therein which together provide the immediate collimation of the instrument merely by insertion of the separately and independently collimated prism housing system into the separately and independently collimated tubular bore between the eye piece or ocular lens and objective lens systems or units in the said bore or bores without further manipulation or proceedings of any kind. The combination also permits interchangeability of any one or more or all of the optical components at will, from one side to the other, or replacement of any one or more or all of the parts in either one or both tubes without recollimation as between the lens tubes and prism systems. It is possible to remove the prism system from the right tube and place it in the left tube with or without recollimation. Ability to do this can become very important in the event of an accident in the field breaking the prism housing or a prism in the right tube and either the eyepiece housing or objective housing of the left tube. Ordinarily, there would be nothing left available to use even as a prism telescope whereas in the present instance, the parts could be readily assembled in preadjusted precollimated position in the left tube.

The chief characteristics of the invention may therefore be summarized by stating that they include an erecting prism system, consisting of a roof prism and a constant deviation prism, so arranged that the entrant central ray and the central exit ray are aligned in a straight line and that the faces of the prisms turned toward each other are arranged obliquely with respect to said straight line and are separated by an opaque diaphragm provided with an aperture located eccentrically with respect to the aforesaid straight line.

The characteristics of the invention further include the mounting for the erecting prism system which constitutes a separate independent unattached subassembly which holds the prisms in a position in which the entrant ray of one prism is aligned with the exit ray of the other prism. The mount thus determines and fixes the definite optical central or main line of the system. This mount is therefore adapted and ready to cooperate, without any specific adjustment or fixation, with an optical viewing instrument with tubular members having an optical axis coinciding with the axis of the tubular members under the sole condition that the mount fits into said tubular members in such a way that the aforesaid main central line of the mount is brought into alignment with the optical and geometrical axis of the tubular members of the viewing instrument. The coincidence of the three lines, namely the optical axis or axes of the lens systems, the geometrical axis of the tubular member or members, and the optical main or center line of the prism system along which the entrant and exit rays of the prisms are aligned, therefore produces automatically collimation upon insertion of the prism mount.

This condition may be reached mechanically by so shaping the members of the prism mount that it has a cylindrical or other suitable contour line adapted to fit into the tubular member or members of the optical viewing instrument. Obviously, the main or central line of the prism system along which the entrant and the exit rays are aligned may thus be brought automatically into a fixed relation to the tubular member and to its axis and thereby alignment of the three above mentioned lines may be produced, provided that previously the optical axis of the viewing instrument has been aligned with the geometrical axis of the tubular member.

It will therefore be clear that no mechanical fixation of the prism mount is necessary as the angular position around the center is of no consequence. It will also be clear that collimation after the insertion of the prism system is unnecessary provided the prism system has been "precollimated" or so arranged that the line along which the central exit and entrant rays are aligned, occupying a predetermined position within the mount itself.

It is a major advantage to permit ready interchangeability. A replacement of the prism system or of one of the lens may take place without re-collimation. Likewise cleaning and repairing of the instrument may take place without recollimation of the same.

A further characteristic of the invention consists in the fact that the prism system as above described permits to obtain a wide angle of view together with a high power magnification and this is particularly the case if a constant deviation prism is used, together with the second prism which is a roof prism, which is provided with an angle between the entrant surface and the surface on which the first deflection is obtained which is so selected that the angle between the marginal ray and the perpendicular to the aforesaid deflecting surface is larger than the critical angle for the index of reflection of the glass of the deviation prism.

Further, since the prism erecting system is designed and adjusted to produce parallelism of the cylindrical or tapered surface of the prism housing with the optical axis of the two prisms involved any manufacturing inaccuracies due to the size of or the optical path length of the said prisms or to slight inaccuracies of the angles of said prisms are compensated for in the separate and independent collimation of the prism system in the prism housing. Ordinarily, such manufacturing inaccuracies are non-compensative.

In the accompanying drawings one embodiment of the present invention is illustrated and wherein:

Figure 1 shows a plan view of the binocular.

Figure 2 is a diagrammatic view of the light ray path through the instrument.

Figure 3 is an axial horizontal section of the parts assembled.

Figure 4 (a) is a view of the prism system housing constructed in one piece instead of as in Figures 4, 7, 8 and 9.

Figure 5 is a side view of the erecting roof prism.

Figure 6 is a similar view of the constant deviation prism with two reflecting surfaces.

Figure 7 is a side elevation of the holder for the erecting prism system with the top plate lifted.

Figure 8 is a front view of Figure 7.

Figure 9 is a top plan view of Figure 8 with the top plate removed.

Figure 10 is a plan view of a modification of the subassembly or erecting unit by placing roof surface on deviation prism and making other prism of a plane surface silvered and lacquered in place of its roof.

Figure 11 is an end view of the deviation prism seen from the left of Figure 10.

Figure 12 is an end view of the erecting prism in Figure 10 seen from the right of Figure 10.

Figure 13 represents a single tube telescope with part of the side broken away to show the position of the erecting prism unit or sub-assembly.

Figure 14 is a diagrammatic view showing the correct relative positions of the ocular, the objective and the erecting prism unit in a single tube telescope, and Figure 15 is a similar view of the same parts in a microscope.

In the drawing the same parts are indicated by the same reference characters.

Figure 4A:
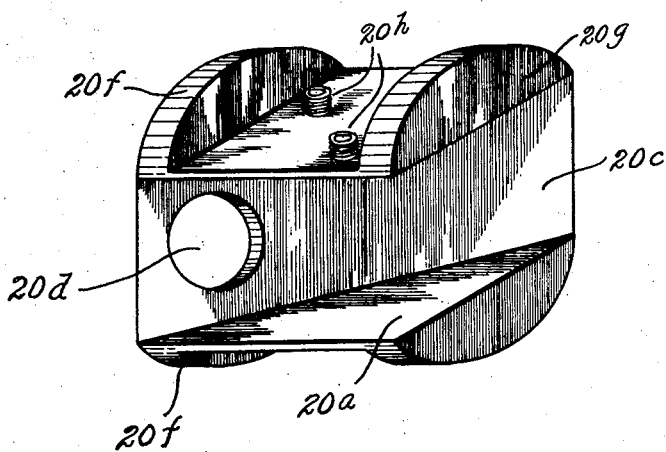
Figure 4 is a part assembly of the erecting prism system unit in side view with the top plate removed.

This binocular field glass consists of a right and a left hand straight bored tubular casing or shell 15, 15 connected by a hinge pin 17 permitting interpupillary adjustment for eye distance, by simply bending the binoculars until the optical lines are set in correct position to suit the operator's eyes.

In order to facilitate assembly each casing or shell 15, 15 is made in two parts, namely, the body portion 15a and the cap portion 15b, Figure 3, suitably joined together, as for instance by threading as at 15c. Into this cap portion the ocular or eye-piece unit 18 is inserted in the usual manner. Each of the body portions 15, 15 of the binocular has a sideway projecting lug 16 joined together by a hinge pin 17 to provide a hinge by means of which the binocular may be adjusted by bending the two casings 15, 15 together with pin 17 as a fulcrum.

As clearly seen from Figure 3, only simple lathe work or straight boring is needed for finish-machining the casings, because all three optical units, the ocular lens system or unit 18, the erecting prism system or unit 20 and the objective lens system or unit 21 are all inserted within the casing in axial alinement thereof. This is exemplified in the diagrammatic view, Figure 2, which indicates the proper relative positions of said three units and shows the actual ray-path there-through from objective to ocular, having one optical axis.

The ocular lens unit 18 is composed, as here shown, of a plane-convex lens 18a, a bi-convex lens 18b and a concave-convex lens 18c all mounted in the usual metallic screw carriers 18d. It is evident that any other combination of lenses may be used.

Similarly, the objective lens unit 21 shows a biconvex lens 21a in a screw carrier 21b. The instrument here shown is a representative binocular and can be made in a variety of optical diameters and magnifications and also made to meet all specifications. This also applies to telescopes, microscopes and the like.

The main feature of the present invention resides in the erecting prism system unit or sub-assembly 20, of Figures 4 or 4 (a), which is inserted about midway between the ocular unit 18 and the objective unit in the casings 15, 15. The prism housing unit 20 is made either in two pieces as in Figure 4 or in one piece as in Figure 4 (a) according to facility of manufacturing equipment available. This unit 20 being reversible on the geometrical axis and movable and rotating in such reversed position, not only in the binocular but also in a straight telescope, a microscope, etc., without recollimation.

The prism unit 20 comprises a shelf or carrier 20a with a removable top 20b held in position by a screw S as in Figure 4, threaded in the carrier, whose top and bottom surfaces 20e and 20a are arched to fit the diameter at 15d of the shell or casing 15, 15. The situation is the same in Figure 4 (a) without removable top but having a recess between the cylindrical end flanges 20f and 20g. Two clamping screws 20h are in this instance provided in said recess for clamping the prisms 22 and 23 in position. The carrier 20a has a middle apertured partition or diaphragm stop 20c running approximately in diagonal direction of the carrier 20a or at right angles to the path of the light rays and forming the shelf proper thereof for supporting the prisms. On this shelf in the erection system is disposed, as best seen in Figure 4, a constant deviation prism 22, Figure 6, with two reflecting surfaces 22a, 22b, one of which, 22a, contacts with one of the surfaces of the apertured partition 20c, while the other surface 22b, which in order to produce good reflection, is silvered, coppered and lacquered, faces outwardly. The sharp pointed end of the deviation prism 22 is preferably blunted and rounded off as at 22c.

The erecting roof prism 23, Figure 5, contacts with one side surface 23a with the apertured partition 20c while its two parallel faces which are the upper and lower faces in Figure 5 are in frictional sliding contact with the parallel walls 20a of the prism mount.

For controlling and passing of the light ray from the reflecting surface 22b of the deviation prism 22, to the roof prism 23, an aperture 20d is provided in the partition 20c of the shelf or carrier 20a in the center of the vertical or widthwise of the partition or diaphragm stop and off center longitudinally near one end, but perpendicular and centered with respect to the optical center or working beam or ray.

Since the erecting prism unit 20 contains a constant deviation prism 22, having two reflecting surfaces 22a and 22b, the alinement of said unit or prism system 20 is accomplished by the aid of the roof prism 23 alone, which construction lends itself to a greatly simplified assembly. Moreover, the amount of crystal or glass here needed being considerably less than in, for instance, the so-called Porro-System, the entire construction can, as a consequence, be made much lighter than the standard binoculars, telescopes, microscopes and the like, this also being aided by the fact that the shell or casing 15 has no side projections for housing the usually built out prism.

The construction of the erecting unit 20 with the two prisms and the carrier or shelf 20a, is such that its alinement can be completed as a sub-assembly and, after proper adjustment, this unit can be assembled in the binocular, fitting snugly in the bore 15d of the casing 15. The binocular by such insertion is automatically and instantaneously collimated. Thus, if at any time it is found necessary to remove the assembled erecting unit 20 from one binocular, it can be changed from right to left or reassembled, without recollimation, in the same construction or to another binocular of similar construction. The erecting unit 20 having no displacement, the eye-piece consequently lies on the optical axis of the objective. In other words the erecting unit 20 rests in the tube bore as do the eye and objective lenses, with no displacement of any of the components resulting in one straight axis for all. The above refers equally well to telescopes, microscopes or other similar optical instruments.

The method used in alining the erecting system is accomplished by the well known and commonly employed collimating devices. After fixation of the deviation prism 22, the roof prism 23 is then orientated so that the collimated image, as seen through the collimating device, coincides with the reference mark in the eye-piece of the collimating device. The erecting system 20 can then be installed as a unit in the binocular housing 15.

Referring now particularly to Figures 10, 11 and 12, a modified form of erecting unit is indicated, in which the constant deviation prism 30, Figures 10 and 11 is, as before, provided with two reflecting surfaces 32a and 32b, of which the former contacts with the apertured partition 20c of the housing 20a, while the other surface 32b, which is silvered, coppered and lacquered, faces outwardly. In this case, the apex is also rounded off as at 32c but the top surface 32d is roofed on this prism instead of on the erecting prism 33. The latter contacts with the apertured partition 20c with one side face 33a.

In Figures 13 and 14 is shown the adaptation of the present invention to a straight telescope 35 with an ocular lens unit 36, an objective lens unit 37 and an erecting prism unit or sub-assembly 38 in proper axial position between the other two units with the erecting roof prism nearest the ocular lens unit 36. These three units in Figure 14 are in all respects the same as those shown in the diagram in Figure 2, but it is evident the arrangement of the prisms as in Figure 10 may be substituted or that the prism unit 38 may be reversed on geometrical axis, so that the constant deviation prism 22 or 30 is placed nearest the ocular.

Lastly, in Figure 15, the invention is exemplified as applied to a microscope wherein the ocular unit is indicated by numeral 40, the objective unit by 41 and the erecting prism unit or sub-assembly indicated by numeral 42. Even in this case the erecting prism unit may be of construction shown in Figure 2 or in Figure 10.

Regarding the sub-assembly or erecting prism unit, whether of the type shown in Figure 2 or in Figure 10, it makes no difference whether the same is placed as in Figure 3 or in reversed position with the prism 22 or 30 nearest the ocular 18, 36 or 40, no realinement or readjustment will be necessary. It will be clear that the values of the angles which are indicated in Figures 5 and 6 are mere examples which correspond to prisms such as used in actual practice and which are therefore representative; they are however not to be considered as necessary values or as part of the invention as claimed.

When in the specification or claims the term "optical instrument" occurs, the same is intended to include telescopes, field and opera glasses, microscopes and the like, whether of the single tube or the binocular type.

It is to be definitely understood that the application of the invention is not limited to the embodiment herein shown and described but that the same can be modified within the limits of the subjoined claims.

Having described the invention, what is claimed as new is:

1. In a prism system for optical viewing instruments including two prisms, each having three optically active faces, one of said prisms being a roof prism, two adjacent optically active faces of the two prisms facing each other being arranged obliquely with respect to the line of sight, said prism system being adapted to align a central entrant ray of one prism with the central exit ray leaving the second prism, an opaque diaphragm between the adjacent surfaces of said prisms provided with an aperture, located eccentrically with respect to the straight line along which the central entrant and exit rays are aligned and providing a passage for the picture forming rays passing through the said adjacent prism faces, while the opaque diaphragm intercepts the passage of undesirable rays.

2. In an optical viewing instrument having lens systems the optical centers of which are aligned along a straight line of sight forming the optical axis of the instrument, a prism system, including two prisms each having three optically active faces, one of said prisms being a roof prism, two optically active adjacent faces of the two prisms facing each other being arranged obliquely with respect to the line of sight, said prisms being placed with respect to each other in such a position that the central entrant ray in one prism is aligned with the central exit ray of the other prism while the prism system is so placed with respect to said optical axis that the said central entrant and exit rays are aligned with the said axis, an opaque diaphragm inserted between the faces of the prisms which are facing each other, said diaphragm being arranged obliquely with respect to said optical axis and provided with an aperture for the passage of the rays passing from one prism to the other, through the adjacent faces of the prisms, said aperture being located eccentrically with respect to the said optical axis, and said opaque diaphragm intercepting the passage of undesirable rays.

3. A mounting for a prism system consisting of two cooperating prisms, each having three optically active faces, one of said prisms being a roof prism, two optically active adjacent faces of the two prisms facing each other being arranged obliquely with respect to the line of sight, said system being adapted to align the central entrant ray of one prism with the central exit ray leaving the other prism, said mounting comprising walls arranged to hold the prisms of the system between them, a diagonally placed diaphragm wall at right angle to said walls, separating the two adjacent optically active prism faces of the two prisms, said diaphragm wall being provided with an aperture for the passage of the picture forming bundle of rays passing between the prisms, said aperture being arranged eccentrically with respect to the straight line aligning the central entrant ray and the central exit ray of the prisms of the prism system.

4. A mount for prism systems of optical viewing instruments with a straight line of sight along an optical axis, adapted to hold the prisms of the system in a pre-adjusted position within the viewing instrument, said prism system including two prisms each having three optically active faces one of said prisms being a roof prism, two optically active adjacent faces of the prisms facing each other being arranged obliquely with respect to the line of sight and said prisms system being further adapted to align the central entrant ray of one prism with the central exit ray leaving the second prism, said mount comprising a diaphragm wall arranged obliquely with respect to the line of sight provided with an eccentric aperture for passing the picture forming rays from one prism of the system to the other, means for holding said prisms on both sides of said diaphragm wall in proper relation with respect to said aperture and means on said mount for locating the straight line along which the central entrant and exit rays are aligned in a predetermined position with respect to the optical axis of the viewing instrument.

5. A prism mount for prism systems, adapted for use in optical viewing instruments with tubular members and lens systems having their optical centers arranged in a straight line forming the optical axis of the instrument, said prism system including two prisms each having three optically active faces, one of said prisms being a roof prism, two optically active adjacent faces of the two prisms facing each other and being arranged obliquely with respect to the line of sight, said prisms being adapted to align the central entrant ray of one prism with the central exit ray leaving the second prism along a straight line, said prism mount comprising a diagonally placed diaphragm wall provided with a substantially circular aperture, two parallel walls at right angle to the diagonal wall for holding the prisms in a position in which their adjacent faces of the said prisms are applied against opposite sides of said diagonal wall, the aperture in the diagonal wall being arranged eccentrically with respect to the straight line along which the entrant and exit rays are aligned.

6. An optical viewing instrument with a tubular member, provided with lens systems the optical centers of which are arranged in a straight line forming an optical axis, coincident with the geometrical axis of the tubular member, comprising a prism system, including two prisms each having three optically active faces, one of said prisms being a roof prism, two optically active adjacent faces of said two prisms facing each other being arranged obliquely with respect to the line of sight, said prism system being adapted to align the central entrant ray of one prism and the central exit ray leaving the second prism along a straight line, a prism mount for said prism system, including two parallel walls, a diagonally placed diaphragm wall at right angles to the parallel walls, provided with a substantially circular aperture, means on said parallel walls for holding the two prisms applied against the said diagonally placed diaphragm wall in a predetermined relation with respect to said aperture, with the aperture in the diagonal diaphragm wall being arranged eccentrically with respect to the straight line along which the central entrant ray and exit ray are arranged, and centering means on said mount for holding the same within the tubular member of the optical viewing instrument in a position in which the straight line along which the central entrant and exit rays are aligned is fixed and is coincident with the optical axis of the lens system and with the geometrical axis of the tubular member.

7. In an optical viewing instrument with a tubular member and with lens systems having their optical centers arranged along a straight line forming the optical axis of the instrument, a prism system, including two prisms, each having three optically active surfaces, one of said prisms being a roof prism and two of said optically active surfaces of the prisms facing each other being arranged obliquely with respect to the line of sight, said prism system being adapted to align the entrant and exit rays entering and leaving the prisms along a straight line, a prism mount comprising two parallel walls, a diagonally placed diaphragm wall, running across said walls at right angles thereto, said diaphragm wall being provided with a substantially circular aperture, said parallel walls holding the two prisms in a position in which said two adjacent faces of the prisms are applied against the two sides of the diagonally placed diaphragm wall, the parallel walls being also parallel to the line along which the central entrant and exit rays are aligned which line is at a predetermined distance from the center of the aperture in the diaphragm wall, centering means on said parallel walls for holding said prism mount within the tubular member in a position of collimation in which the optical axis of the viewing instrument is coincident with the aforesaid line along which the entrant and exit rays of the prism system is aligned and is at a predetermined distance from the center of the aperture in said diagonal diaphragm wall.

8. In an optical viewing instrument with a tubular member and with lens systems having their optical centers arranged in a straight line forming the optical axis of the instrument, a prism system including two prisms each provided with three optically active surfaces, one of said prisms being a roof prism, and two adjacent optically active surfaces of the two prisms facing each other being arranged obliquely with respect to the line of sight, said prism system being adapted to align a central entrant and exit ray along a straight line, a prism mount, comprising two parallel walls, which are also parallel to the line along which the entrant and exit rays of the prism system is aligned, a diagonally placed diaphragm wall at right angles to the parallel walls provided with a substantially circular aperture, means on said parallel walls for holding the two prisms in a position in which said two optically active surfaces of the prisms facing each other are applied against the two opposite sides of the said diagonally placed diaphragm wall and are held in proper position with respect to said aperture, segments projecting outwardly from the said parallel walls at right angles thereto, said segments fitting into the tubular members and holding the mount frictionally within the said tubular members in a predetermined position in which the optical axis of the instrument is coincident with the line along which the entrant and exit rays of the prism system are aligned and is at a predetermined distance from the center of the circular aperture in the said diaphragm wall.

9. A prism mount adapted for the pre-collimation of a prism system, inserted into an optical viewing instrument, having tubular members and lens systems, the optical centers of which are aligned along an optical axis, coinciding with the geometrical axis of said tubular members, said prism system including two prisms, one of said prisms being a roof prism, and each prism being provided with three optically active surfaces, two adjacent optically active surfaces of said two prisms facing each other being arranged obliquely with respect to the line of sight, said prism system being adapted to align a central entrant ray with the central exit ray leaving the prism system, said prism mount comprising two parallel walls for holding the prisms between them, a diagonally placed diaphragm wall, running across the parallel walls at right angles thereto, and provided with a substantially circular aperture, means for fixing the prisms between said diaphragm wall and said parallel walls in a pre-collimated position in which the two adjacent optically active surfaces of the prisms are applied against the two opposite sides of said diaphragm wall, the said parallel walls being so arranged that the line along which the central entrant and exit rays of prism system are aligned is parallel to the two walls, and is equidistant from the same and intersects the diaphragm wall at a predetermined distance from the center of the aperture, centering segments extending outwardly from said parallel walls at right angles thereto, having a contour adapted to align the mount within the tubular members in a definite position in which the aforesaid line along which the central rays are aligned is always coincident with the geometrical axis of the tubular member and with the optical axis of the lens system, said mount holding the prism system in proper position for cooperation with the lens system in every angular position, the mount may adopt within the tubular members of the optical instrument.

10. In a prism system for optical viewing instruments, comprising two prisms, each having at least three optically active surfaces, one of said prisms being a roof prism, while the other is a constant deviation prism, the latter being provided with an angle between the entrant surface and the surface on which the first deflection is obtained which is so selected that the angle between the marginal ray and perpendicular to the aforesaid reflecting surface is larger than the critical angle for the index of refraction of the glass of said prism, said prism system having two of the optically active adjacent faces of the prisms facing each other arranged obliquely with respect to the line of sight and said system being adapted to align the central entrant ray of a picture forming bundle of rays with the central exit ray leaving the prism system in a straight line, an opaque diaphragm between said prisms, provided with an aperture located eccentrically with respect to the straight line along which the two central rays entering and leaving the prism system are aligned, said aperture providing a passage for the picture forming rays passing through the said adjacent prism faces, while the opaque diaphragm intercepts the passage of undesirable rays.

BERNARD T. MAXWELL.

REFERENCES CITED

The following references are of record in the file of this patent:

UNITED STATES PATENTS

| Number | Name | Date |
|---|---|---|
| 674,465 | Hensoldt | May 21, 1901 |
| 819,948 | Swasey et al. | May 8, 1906 |
| 1,012,715 | Saegmuller | Dec. 26, 1911 |
| 1,952,759 | Konig | Mar. 27, 1934 |
| 2,135,531 | Reichert | Nov. 8, 1938 |
| 2,282,632 | Wittig | May 12, 1942 |
| 2,359,609 | Bausch | Oct. 3, 1944 |
| 2,389,252 | Gallasch | Nov. 20, 1945 |

FOREIGN PATENTS

| Number | Country | Date |
|---|---|---|
| 15,318 | Great Britain | July 25, 1905 |
| 93,430 | Austria | July 10, 1923 |